US007918600B2

(12) United States Patent
Nagata et al.

(10) Patent No.: US 7,918,600 B2
(45) Date of Patent: Apr. 5, 2011

(54) PLANAR ILLUMINATION DEVICE AND LIQUID CRYSTAL DISPLAY DEVICE USING THE SAME

(75) Inventors: Takayuki Nagata, Osaka (JP);
Kazuhisa Yamamoto, Osaka (JP);
Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 482 days.

(21) Appl. No.: 12/183,420

(22) Filed: Jul. 31, 2008

(65) Prior Publication Data
US 2009/0040787 A1  Feb. 12, 2009

(30) Foreign Application Priority Data

Aug. 9, 2007 (JP) .................................. 2007-207575

(51) Int. Cl.
*F21V 7/04* (2006.01)
(52) U.S. Cl. ........ 362/616; 362/613; 362/609; 362/322; 362/259; 349/65
(58) Field of Classification Search .................. 362/601, 362/609, 611, 612, 613, 616, 628, 259, 297, 362/322, 323; 349/65–67
See application file for complete search history.

(56) References Cited

U.S. PATENT DOCUMENTS

| | | | | |
|---|---|---|---|---|
| 2,646,637 A * | 7/1953 | Mungall et al. | ................. | 40/364 |
| 3,242,328 A * | 3/1966 | Kapany et al. | ................. | 362/628 |
| 5,575,549 A * | 11/1996 | Ishikawa et al. | ............... | 362/625 |
| 5,863,114 A * | 1/1999 | Nagatani et al. | ............... | 362/328 |
| 6,134,092 A * | 10/2000 | Pelka et al. | ...................... | 361/31 |
| 6,161,939 A * | 12/2000 | Bansbach | ...................... | 362/223 |
| 6,247,826 B1 * | 6/2001 | Funamoto et al. | ............ | 362/603 |
| 6,808,281 B2 * | 10/2004 | Ho | ................. | 362/600 |
| 7,374,329 B2 * | 5/2008 | Feng et al. | ...................... | 362/626 |
| 7,572,045 B2 * | 8/2009 | Hoelen et al. | .................. | 362/628 |
| 7,866,872 B2 * | 1/2011 | Okumura | ...................... | 362/628 |
| 2004/0076010 A1* | 4/2004 | Kuo | ............................. | 362/332 |
| 2004/0114343 A1* | 6/2004 | Ho | .................................. | 362/31 |

FOREIGN PATENT DOCUMENTS

JP   11-271767   10/1999
JP   2001-228477   8/2001

* cited by examiner

*Primary Examiner* — Ali Alavi
(74) *Attorney, Agent, or Firm* — Wenderoth, Lind & Ponack, L.L.P.

(57) ABSTRACT

A thin planar illumination device with a high light utilization efficiency is provided. In a planar illumination device 10, light source sections 15, 16, 17 and 18 each radiates laser light. The light guide members 19 and 20 polarize, by total reflection, light incident from side surfaces 19*b* and 20*b* on two opposite sides thereof, so as to be radiated from incident surfaces 19*a* and 20*a*, respectively. In a light guide plate 21, the light is incident from side surfaces beside the respective light guide members 19 and 20 so as to radiate irradiation light 24 from main surfaces 21*a* and 21*b*. The main surface of the light guide plate 21 is formed by a plurality of inclined surfaces, each being gradually thinned from the edge surfaces on two sides thereof toward a center thereof.

25 Claims, 7 Drawing Sheets a)

b)

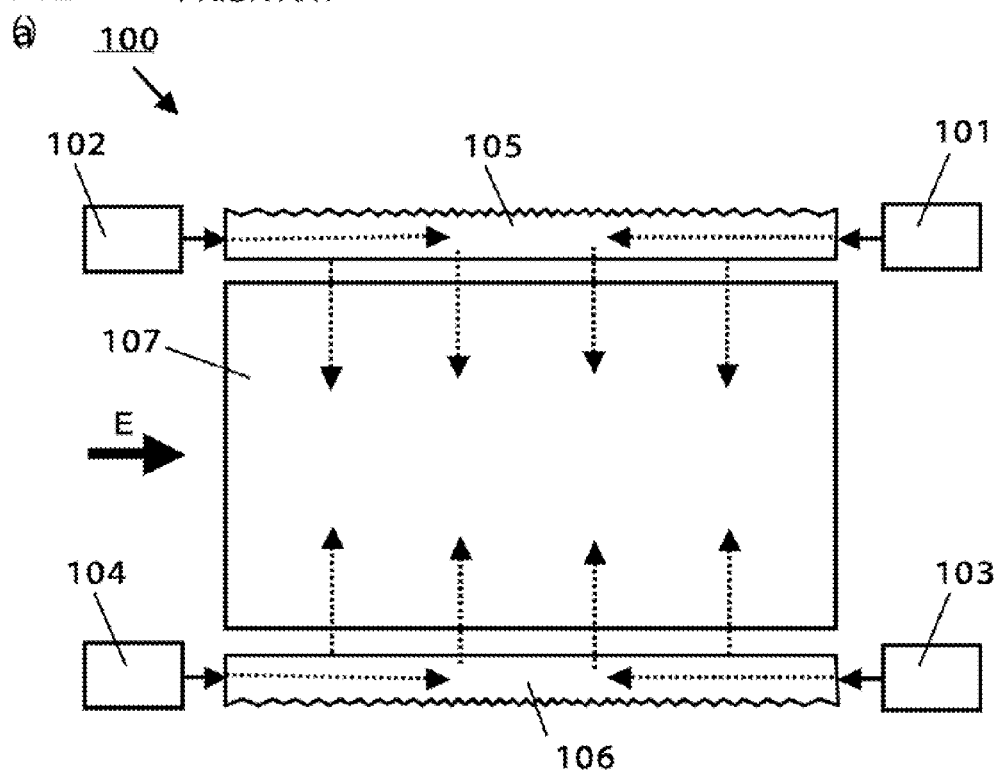
FIG. 12 PRIOR ART
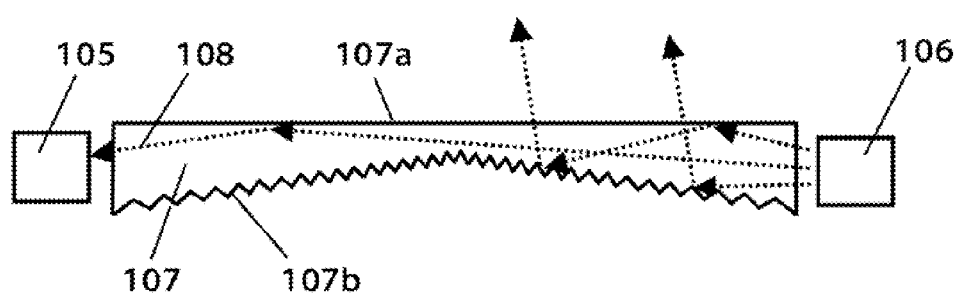

PLANAR ILLUMINATION DEVICE AND LIQUID CRYSTAL DISPLAY DEVICE USING THE SAME

BACKGROUND OF THE INVENTION

1. Field of the Invention

The present invention relates to a planar illumination device in which laser light is used as a light source and a liquid crystal device using the planar illumination device, and more particularly to a planar illumination device that is thin and applicable to a large screen display and that has a high light utilization efficiency, and a liquid crystal device using the planar illumination device.

2. Description of the Background Art

Generally, as a liquid crystal device used for a display panel and the like, a planar illumination device using a light source such as an electric discharge tube or a light-emitting diode (LED) as backlight illumination is employed. In recent years, when the planar illumination device is used in a large display and the like, light having high brightness and high monochromaticity is required. Therefore, a planar illumination device using a laser light source has been considered.

Such a display panel requires a technique to reduce luminance unevenness on the entire surface of the display panel to thereby make uniform the brightness thereof, or a technique to improve the light utilization efficiency to thereby reduce power consumption. Also, in recent years, along with the upsizing of the display panel, there is an increased demand to construct the display panel to be thinner for usage as a wall-mounted television or the like.

As a method of reducing the thickness of a planar illumination device used for a display panel, there is a technique called an edge light system. In the edge light system, light is incident from aside surface of a light guide plate, and the incident light is deflected toward a main surface of the light guide plate by using deflection ridges or a diffusion member provided on a bottom surface of the light guide plate so as to be radiated from the main surface of the light guide plate, thereby obtaining planar illumination. The edge light system has a characteristic that a light source is arranged in a planar manner, i.e., a planar illumination device can be structured to be thinner than the case where a so-called direct-under system is used.

In the edge light system, as a structure which realizes a large screen and high brightness, a structure in which light is incident from side surfaces on two sides of a light guide plate has been proposed. As disclosed in Japanese Laid-Open Patent Publication No. 2001-228477 (hereinafter, referred to as patent document 1), for example, a light guide plate is formed such that a surface on the side of a liquid display panel (main surface) is a flat surface, and a surface opposite to the main surface, on which deflection ridges are formed (bottom surface) is gradually thinned from both side surfaces from which light is incident toward a center thereof (i.e., the bottom surface is formed into an inverted V-shape). With such a structure, the weight of the light guide plate also can be reduced.

Furthermore, a light source having a high output is required in order to respond to a screen with an increased size. This can be realized by using a high output laser light source. As a structure using a laser light source, a structure proposed in Japanese Laid-Open Patent Publication No. 11-271767 (hereinafter, referred to as patent document 2) can be used, for example. Patent document 2 proposes the structure in which LEDs are disposed on two sides of a rod-shaped light guide member. When the LEDs are replaced with high output laser light sources in this structure, however, it is possible to realize a high output linear light source, and therefore this structure is applicable to a large screen display.

In order to realize a thin and large screen display, it may be suitable to combine the structure of the light guide plate proposed in patent document 1 with a high output laser light source. Furthermore, the structure proposed in patent document 2 can be used to convert light from a laser light source into a linear light source.

However, even with a structure obtained by combining patent document 1 with patent document 2, there has been a problem in that a portion of light incident from side surfaces on two sides of a light guide plate reaches the side surface on an opposite side from which the light is incident, and then the portion of light is to be radiated therefrom, thereby reducing a light utilization efficiency. Hereinafter, this problem will be described.

FIG. 12 is a diagram illustrating a schematic structure of a conventional planar illumination device 100 having a structure obtained by combining patent document 1 with patent document 2. Particularly, FIG. 12(*a*) is a schematic view of the planar illumination device 100 as viewed from a top surface thereof. FIG. 12(*b*) is a schematic view illustrating a structure of a main portion included in a side surface of the planar illumination device 100 as viewed from an arrow E of FIG. 12(*a*).

In FIGS. 12(*a*) and (*b*), the planar illumination device 100 comprises laser light sources 101 to 104, rod-shaped light guide members 105 and 106, and a light guide plate 107. The light guide plate 107 is formed such that a main surface 107*a* from which light is incident is a flat surface and a bottom surface 107*b* is gradually thinned toward a center thereof. On the bottom surface 107*b*, deflection ridges for deflecting the light incident on the light guide plate 107 toward the main surface 107*a* are formed.

In the planar illumination device 100 structured in such a manner as described above, laser light radiated from laser light sources 101, 102, 103 and 104 is converted into linear light by light guide members 105 and 106, so as to be incident on the light guide plate 107. For conciseness, in FIG. 12(*b*), only laser light radiated from the light guide member 106 is indicated by a dotted line, and laser light radiated from the light guide member 105 is omitted. As shown in FIG. 12(*b*), among light incident on the light guide plate 107, a portion of luminous flux 108 passes through the light guide plate 107 so as to reach a side surface on an opposite side, thereby causing a light quantity loss.

SUMMARY OF THE INVENTION

Therefore, in order to solve the problem mentioned above, an object of the present invention is to provide a planar illumination device that is thin and applicable to a large screen and that has a highlight utilization efficiency and a liquid crystal device using the planar illumination device.

For attaining the object mentioned above, a planar illumination device of the present invention comprises a linear light source section for radiating linear laser light; and a light guide plate for causing the linear laser light to be incident from edge surfaces on two opposite sides thereof so as to be radiated from one main surface. The main surface of the light guide plate is formed by a plurality of inclined surfaces, and the light guide plate is formed so as to be gradually thinned toward a center thereof.

In this case, it is preferable that a thickness of a central portion of the light guide plate is thinner than that of each of the edge surfaces on two sides of the light guide plate.

Thus, in the planar illumination device, the light having a high uniformity can be radiated from the light guide plate, and the light incident from the edge surfaces of the light guide plate can be reduced so as not to be radiated from the edge surface on an opposite side, thereby making it possible to improve the light utilization efficiency.

Preferably, the light guide plate has a deflection member for deflecting light incident on a bottom surface, opposite to the main surface, of the light guide plate toward the main surface, and at least one of the plurality of inclined surfaces is formed such that if the one of the inclined surfaces is hypothetically extended, the extended inclined surface would intersect with a portion of the bottom surface. Thus, it becomes possible to prevent the light incident on the light guide plate from being radiated from the edge surface on the opposite side.

In this case, it is desirable that the main surface of the light guide plate is formed by the two inclined surfaces which are inclined from the edge surfaces on two sides thereof toward the center thereof, and the light guide plate is formed such that the main surface forms a concave shape. Thus, the uniformity of the light to be radiated from the light guide plate is improved, and it becomes possible to prevent the light from being leaked from each of the edge surfaces of the light guide plate.

Alternatively, it is desirable that the main surface of the light guide plate is formed by the two inclined surfaces which are inclined from the respective edge surfaces on two sides thereof toward the center thereof and one flat surface joined to the two inclined surfaces, and the light guide plate is formed such that the main surface forms a concave shape.

The planar illumination device further comprises a prism sheet for adjusting a radiation angle distribution of light to be radiated from the light guide plate, and the prism sheet is disposed along the inclined surfaces of the light guide plate. Thus, it becomes possible to reduce a loss of light to be recycled and thus the light utilization efficiency can be further improved.

The planar illumination device may be structured such that a diffusion plate or a lenticular lens is disposed on a side of the main surface of the light guide plate. Due to a shape of the light guide plate, the bottom surface of the light guide plate is kept apart from the diffusion plate or the lenticular lens, thereby making it possible to make uniform the incident light even if the light guide plate is thin.

Alternatively, a fine periodical structure may be formed on the inclined surfaces of the light guide plate. Thus, it becomes possible to obtain an effect of polarization separation or wavelength separation.

Preferably, a space between the inclined surfaces of the light guide plate and the diffusion plate or the lenticular lens may be sealed. Thus, it becomes possible to protect the fine periodical structure formed on the inclined surfaces of the light guide plate.

Alternatively, it is desirable that the main surface of the light guide plate is formed by the four inclined surfaces disposed in series between the edge surfaces on two sides thereof, and the light guide plate is formed such that two central inclined surfaces among the four inclined surfaces form a convex V-shape. Thus, a distance over which light is propagated through the interior of the light guide plate can be shortened, there by making it possible to reduce the light absorption loss in the light guide plate.

The main surface of the light guide plate is formed by the plurality of inclined surfaces, each being gradually thinned toward the center thereof and a plurality of incident surfaces, each being disposed between the inclined surfaces, and the plurality of incident surfaces of the light guide plate are formed such that nearly parallel light radiated from the edge surfaces on two sides thereof is incident on the incident surfaces. Thus, it becomes possible to reduce a weight of the light guide plate and the light absorption loss in the light guide plate.

The light guide plate may include minute diffusion particles in the interior thereof. Thus, it becomes possible to reduce a light quantity loss caused by the light to be radiated from a side opposite each of the incident surface after passing through the interior of the light guide plate.

The linear light source section is formed so as to radiate light nearly parallel to the main surface of the light guide plate toward the edge surfaces on two sides of the light guide plate, and in the light guide plate, a large number of deflection ridges are formed on a bottom surface opposite to the main surface so as to deflect, by total reflection, the light incident from the linear light source section. Thus, the majority of light incident on the light guide plate is deflected by total reflection so as to be radiated from the main surface, thereby making it possible to improve the light utilization efficiency.

The linear light source section is formed such that the nearly parallel light is radiated toward a direction orthogonal to a thickness direction of the light guide plate and such that the nearly parallel light is radiated so as to be polarized horizontally or perpendicularly to the inclined surfaces respectively adjacent to the edge surfaces on two sides of the light guide plate, and the light guide plate is formed such that the nearly parallel light is incident from the linear source section perpendicularly to the edge surfaces on two sides of the light guide plate. Furthermore, the deflection ridges are formed so as to be parallel to the edge surfaces on two sides thereof.

Thus, the light polarized in the same direction is radiated from the light guide plate, thus improving a transmittance of the liquid display panel when the planar illumination device is combined with a liquid display panel and thereby improving the light utilization efficiency.

It is desirable that the linear light source section includes: a laser light source for radiating divergent light; a collimate component for converting the divergent light radiated from the laser light source into the nearly parallel light; and a rod-shaped light guide member for causing the light radiated from the collimate component to be incident from edge surfaces so as to be radiated from a side surface.

Alternatively, it is desirable that the linear light source section includes: a laser light source for radiating divergent light; a collimate component for converting the divergent light radiated from the laser light source into the nearly parallel light; and a polygon mirror for deflecting and scanning the light radiated from the collimate component.

Alternatively, it is desirable that the linear light source section includes: a laser light source for radiating divergent light; a collimate component for converting the divergent light radiated from the laser light source into the nearly parallel light; and a one-dimensional diffusion component for diffusing the light radiated from the collimate component in a one-dimensional direction by deflection, diffraction or dispersion.

With such structures, it becomes possible to realize the linear light source section for radiating the nearly parallel light.

In this case, it is desirable that the light guide plate is formed such that each of the deflection ridges has a curved surface and a tangent of the curved surface is inclined at 30 to 60 degrees with respect to the main surface. Thus, light can be radiated from the light guide plate while adjusting a viewing angle of the light, thereby making it possible to reduce the number of viewing angle adjustment sheets and thus realizing a reduced cost.

Preferably, the light guide plate is formed by injection molding and a gate is provided at the thinnest portion of a side surface orthogonal to each of the edge surfaces on two sides thereof. Thus, at a time when manufacturing the light guide plate, the resin flows easily to thereby mitigate a residual stress and reduce multi-deflection.

The linear light source section is disposed along longitudinal side surfaces of the light guide plate. Thus, the distance over which the light is propagated through the interior of the light guide plate can be shortened, thereby making it possible to reduce the light absorption loss in the light guide plate.

Furthermore, the planar illumination device of the present invention comprises: laser light source for radiating a laser light; a rod-shaped light guide member for causing the laser light to be incident from edge surfaces on two opposite sides thereof so as to be radiated from a side surface; and a light guide plate for causing the light radiated from the light guide member to be incident from an at least one edge surface so as to be radiated from one main surface. The light guide member is formed so as to have a rectangular cross-section parallel to each of the edge surfaces on two sides thereof, and the side surface, of the light guide member, from which the light is radiated is formed by a plurality of inclined surfaces, and the light guide member is formed so as to be gradually thinned toward a center thereof.

Thus, the light having a high uniformity can be radiated from the light guide plate, and the light incident from the edge surfaces of the light guide plate can be prevented from being radiated from the edge surface on an opposite side, thereby making it possible to improve the light utilization efficiency.

The side surface, of the light guide member, from which the light is radiated is formed by the two inclined surfaces which are inclined from the respective edge surfaces on two sides thereof toward a center thereof, and the light guide member is formed such that the side surface forms a concave shape. Thus, the uniformity of the light to be radiated from the light guide plate is improved, and it becomes possible to prevent light from being leaked from each of the edge surfaces of the light guide member.

Alternatively, the side surface, of the light guide member, from which the light is radiated is formed by the two inclined surfaces which are inclined from the respective edge surfaces on two sides thereof toward a center thereof and one flat surface joined to the two inclined surfaces, and the light guide member is formed such that the side surface forms a concave shape.

Still alternatively, the side surface, of the light guide member, from which the light is radiated is formed by the four inclined surfaces disposed in series between the edge surfaces on two sides thereof, and the light guide member is formed such that two central inclined surfaces among the four inclined surfaces form a convex V-shape. Thus, the distance over which the light is propagated through the interior of the light guide member can be shortened, thereby making it possible to reduce the light absorption loss in the light guide member.

Furthermore, for attaining the object mentioned above, a liquid crystal device of the present invention comprises: a liquid display panel; and a backlight illumination device for illuminating the liquid display panel from a side of a bottom surface thereof, and any of the planar illumination devices described above is used as the backlight illumination device.

With such a structure, it becomes possible to provide a liquid crystal device with an excellent color reproduction, a high brightness and little luminance unevenness even when a large screen is used. Furthermore, a thin liquid crystal device is realized.

According to the present invention, it becomes possible to realize a thin planar illumination device using a laser light source and having a high light utilization efficiency. The planar illumination device is used as the backlight illumination device, thereby producing a significant effect which realizes a thin display device with a large area and high brightness.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram illustrating a schematic structure of a conventional planar illumination device 100.

DESCRIPTION OF THE PREFERRED EMBODIMENTS

Figure 1:
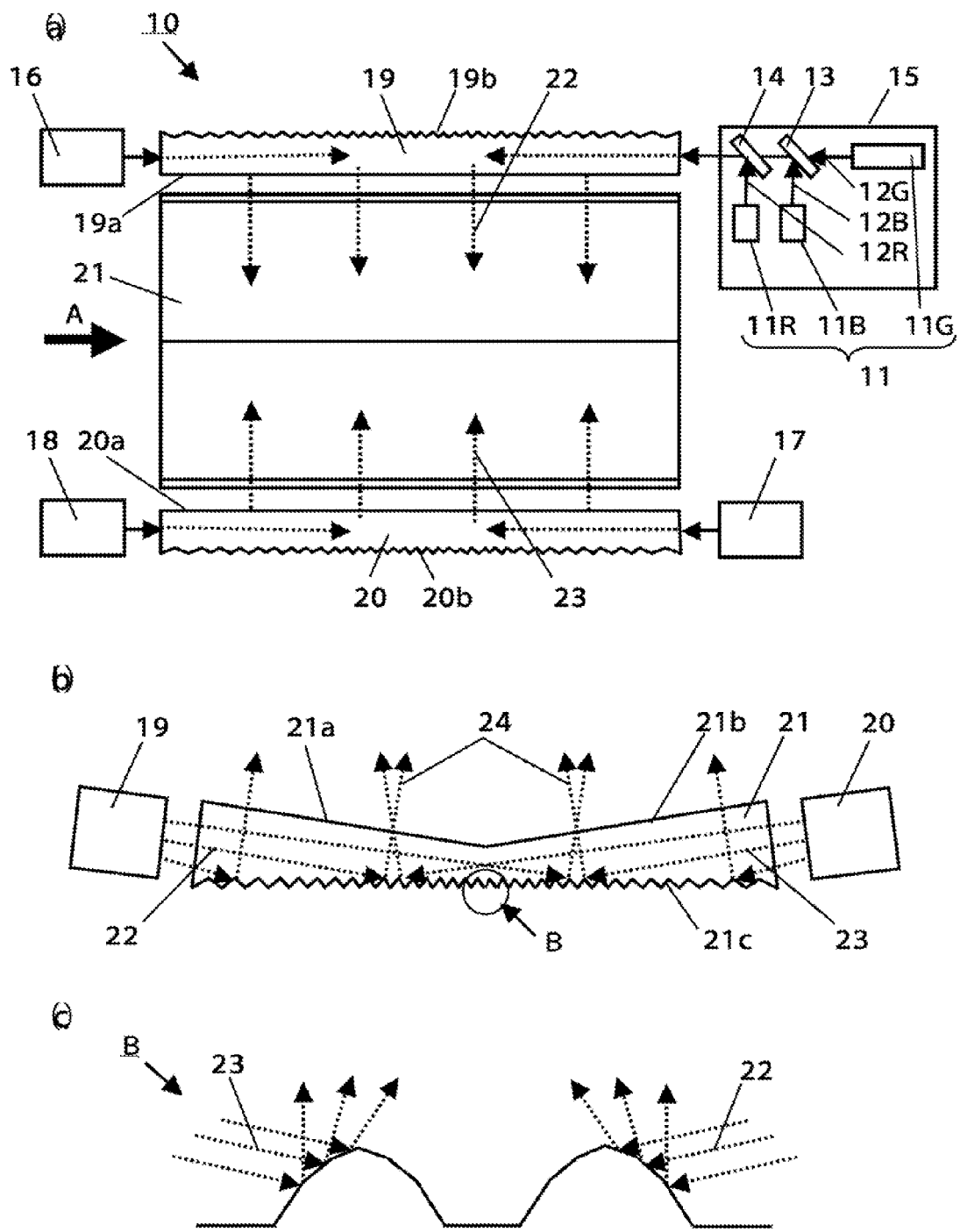
FIG. 1 is a diagram illustrating an exemplary schematic structure of a planar illumination device 10 according to a first embodiment of the present invention.

Hereinafter, the respective embodiments of the present invention will be described with reference to the drawings. Note that there may be a case where components of one embodiment which are the same as those of the other embodiments will be denoted by the same reference numerals, and any descriptions thereof will be omitted. Also, each drawing schematically shows main components for assisting the reader in facilitating the understanding of the present invention, but does not indicate, for example, proper shapes thereof.

First Embodiment

FIG. 1 is a diagram illustrating an exemplary schematic structure of a planar illumination device 10 according to a first embodiment of the present invention. FIG. 1(a) is a schematic view of the planar illumination device 10 as viewed from a top surface thereof. FIG. 1(b) is a schematic view illustrating a structure of a main portion included in a side surface of the planar illumination device 10 as viewed from an arrow A of FIG. 1(a). FIG. 1(c) is an enlarged view of a portion B shown in FIG. 1(b).

In FIGS. 1(a) and (b), the planar illumination device 10 comprises light source sections 15, 16, 17 and 18, light guide members 19 and 20, and a light guide plate 21. The light source section 15 includes a laser light source 11, and dichroic mirrors 13 and 14. The laser light source 11 is formed of a red laser light source (R light source) 11R for radiating red laser light (R light) 12R, a green laser light source (G light source) 11G for radiating green laser light (G light) 12G, and a blue laser light source (B light source) 11B for radiating blue laser light (B light). Each of the dichroic mirrors 13 and 14 multiplexes the red laser light (R light) 12R, the green laser light (G light) and the blue laser light (B light). Each of the light source sections 16, 17, 18 has the same structure as that of the light source section 15, and therefore any descriptions thereof will be omitted. Note that the light source sections 15, 16, 17 and 18 and the light guide members 19 and 20 form a linear light source section.

The respective R, G and B light sources 11R, 11G and 11B included in each of the light source sections 15 to 18 are formed so as to cause the R light, the G light and the B light to be polarized nearly horizontally or perpendicularly to a main surface 21a or 21b of the light guide plate 21, and to be polarized in the same direction. Furthermore, although not shown in FIG. 1, each of the R, G and B light sources 11R, 11G and 11B has a collimate lens and is formed so as to radiate nearly parallel light.

Laser light is incident on the light guide members 19 and 20 from the light source sections 15, 16, 17 and 18. Each of the light guide members 19 and 20 has a quadrangular prism shape, and is formed such that four surfaces other than two surfaces on which light is incident, are horizontal or perpendicular to polarized light radiated from the light source sections 15 and 16 or 17 and 18, thereby causing light incident on a side surface 19b or 20b to be polarized by the total reflection so as to be directed to a radiation surface 19a or 20b. Furthermore, in each of the light guide members 19 and 20, deflation ridges are formed, each of the deflation ridges having a surface inclined by nearly 45 degrees with respect to the radiation surface 19a or 20a.

Furthermore, in the light guide plate 21, light is incident from side surfaces (incident surfaces) respectively beside the light guide members 19 and 20, and irradiation light 24 is radiated from the main surfaces 21a and 21b. The light guide plate 21 is formed such that the main surfaces 21a and 21b are inclined from the respective incident surfaces toward a center thereof, and the main surfaces 21a and 21b are formed such that if each of the main surfaces 21a and 21b is hypothetically extended toward the incident surface opposite thereto, the extended surface would intersect with a bottom surface 21c.

Furthermore, as shown in FIG. 1(c), the deflection ridges are formed on the bottom surface 21c such that the light incident on the light guide plate 21 is polarized by the total reflection so as to be directed to the main surfaces 21a and 21b. The deflection ridges have curved surfaces on which faces inclined by 40 to 60 degrees with respect to the main surface 21a or 21b, for example, are contiguously joined. The deflection ridges are formed so as to be nearly parallel to each of the incident surfaces.

Next, an operation of the planar illumination device 10 structured in such a manner as described above will be described. In FIG. 1(a), the laser lights 12R, 12G and 12B, all of which are radiated from the R light source 11R, the G light source 11G and the B light source 11B respectively and then polarized nearly parallel to the main surface 21a of the light guide plate 21, for example, are collected by the dichroic mirrors 13 and 14 to form one laser light as an RGB light so as to be radiated from the light source section 15. Similarly, one laser light formed by collecting the R, G and B lights is radiated from the light source section 16 so as to be polarized nearly parallel to the main surface 21a. Furthermore, one laser light formed by collecting the R, G and B lights is radiated from each of the light source sections 17 and 18 so as to be polarized nearly parallel to the main surface 21b. The laser light radiated from the light source sections 15, 16, 17 and 18 are converted into linear light by the light guide member 19 or 20 so as to be incident on the both side surfaces of the light guide plate 21.

Note that each side surface of the light guide member 19 or 20 is perpendicular to a polarization plane of light radiated from the light source sections 15, 16, 17 and 18, or parallel to polarized light, and thus the polarized light is maintained while the light is reflected and propagated through the interior of the light guide member 19 or 20. Therefore, light polarized in the same direction is radiated from the light guide member 19 or 20 so as to be perpendicular to the radiation surface 19a or 20a, and further to be incident at an angle nearly parallel to the main surface 21a or 21b of the light guide plate 21. In this case, the light guide plate 21 may be formed such that each incident surface is inclined toward the incident light, thereby causing the incident light to be deflected by the incident surface so as to be incident on the light guide plate 21 nearly parallel to the main surface 21a or 21b.

Propagation light 22 incident on the light guide plate 21 from the light guide member 19 travels through the interior of the light guide plate 21 in a direction nearly parallel to the main surface 21a, and almost all luminous flux of the propagation light 22 is totally reflected by the deflection ridges provided on the bottom surface 21c and then polarized, and the polarized light is further radiated from the main surface 21a or 21b as the irradiation light 24.

In this case, because the main surface 21a of the light guide plate 21 is formed such that if the main surface 21a is extended, the extended main surface would intersect with the bottom surface 21c, the propagation light 22 being propagated nearly parallel to the main surface 21a will never pass through the light guide plate 21 and then leak from the side surface opposite to the main surface 21a of the light guide plate 21. Therefore, it becomes possible to prevent a light quantity loss which is a problem in a conventional structure. The same is also true of propagation light 23.

Also, in this case, the deflection ridges provided on the bottom surface 21c are formed so as to be parallel to each of the incident surfaces, i.e., perpendicular to each of the propagation lights 22 and 23 in the interior of the light guide plate 21, and thus the light polarized in the same direction is radiated from the light guide plate 21.

The planar illumination device 10 structured in such a manner as described above is formed such that light incident on the light guide plate 21 is nearly parallel with respect thereto, and all propagation lights which have reached the deflection ridges satisfy a condition of the total reflection, thereby obtaining an extremely high light utilization efficiency. Furthermore, unlike the conventional structure, even if light nearly parallel to the light guide plate 21 is incident thereon, the light would not be radiated from a side opposite each of the incident surfaces after passing through the light guide plate 21, whereby a light quantity loss never occurs.

Furthermore, in the planar illumination device 10, the deflection ridges, each having a curved inclined surface, are provided on the bottom surface 21c of the light guide plate 21, thereby causing a radiation angle of the irradiation light 24 to be approximately ±30 degrees with respect to a direction orthogonal to the deflection ridges and therefore the number of viewing angle adjustment sheets for adjusting an viewing angle in the above direction can be reduced. Thus, it becomes possible to realize a reduced cost.

Furthermore, the planar illumination device 10 has the advantage of being constructed to be thin and to radiate light polarized in the same direction. Also, light is incident from the both side surfaces of the light guide plate 21, thereby making it possible to radiate light having an excellent uniformity.

Figure 2:
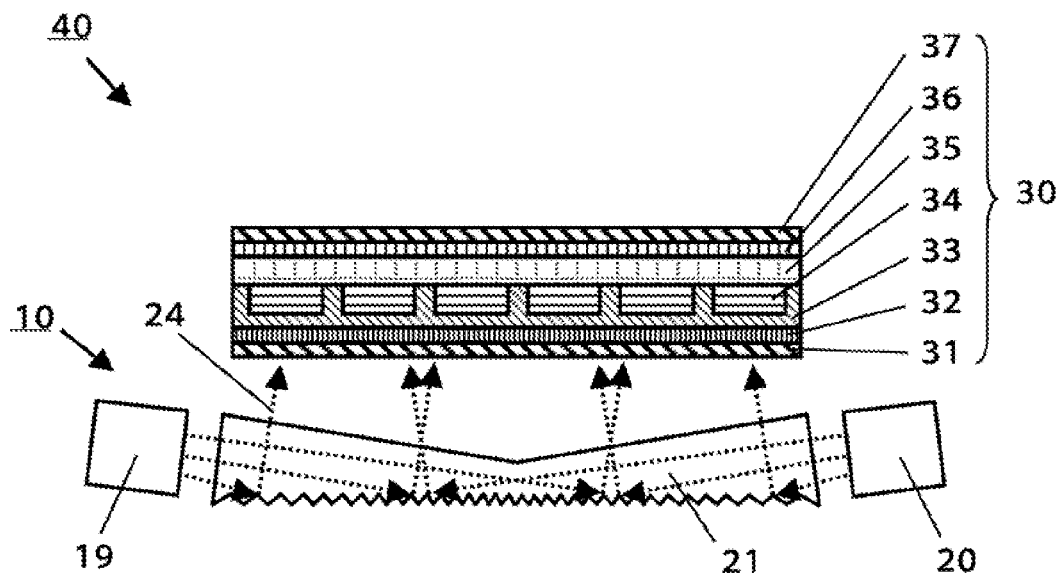
FIG. 2 is a diagram illustrating a schematic structure of a liquid crystal device 40 in which the planar illumination device 10 shown in FIG. 1 is used as a backlight illumination device.

Furthermore, the planar illumination device 10 can be used as a backlight illumination device of a liquid crystal device such as a large display, a high brightness display and the like. FIG. 2 is a diagram illustrating a schematic structure of a liquid crystal device 40 in which the planar illumination device 10 shown in FIG. 1 is used as a backlight illumination device. A structure of the liquid crystal device 40 shown in FIG. 2 is the same as that of the planar illumination device 10 shown in FIG. 1(b) except that a liquid display panel 30 is additionally provided. The liquid crystal device 40 comprises the liquid display panel 30 and the planar illumination device 10. The planar illumination device shown in FIG. 2 is the same as that shown in FIG. 1, and therefore any description thereof will be omitted.

In FIG. 2, the liquid display panel 30 includes a polarizing plate 31, a glass plate 32, a liquid crystal 33, an RGB pixel 34, a color filter 35, a glass plate 36, and a polarizing plate 37. Note that the liquid display panel 30 is formed such that a direction of a transmittance axis of the polarizing plate 31 coincides with a polarization direction of the irradiation light 24 of the planar illumination device 10.

In the liquid crystal device 40 constructed in such a manner as described above, the irradiation light 24 radiated from the planar illumination device 10 mostly passes through the polarizing plate 31 of the liquid display panel 30 so as to further pass through the glass plate 32. Then, the light having passed through the polarizing plate 31 and the glass plate 32 is modulated in the liquid crystal 33 and the RGB pixel 34, and then the modulated light passes through the color filter 35, the glass plate 36 and the polarizing plate 37 so as to be displayed as an image of the liquid crystal device 40.

The liquid crystal device 40 according to the present embodiment, which is constructed in such a manner as described above uses a laser as a light source, thereby realizing a thin liquid crystal device having a wide color reproduction range. Furthermore, because backlight illumination is polarized in the same direction, the light quantity loss is substantially reduced in the polarizing plate provided on the side of the backlight illumination device, thereby realizing a high brightness and low power consumption. Further, due to the uniform backlight illumination with no luminance unevenness, it becomes possible to realize a liquid crystal device with a high image quality.

The present embodiment illustrates an example where the planar illumination device 10 causes the dichroic mirrors 13 and 14 to multiplex the R light, the G light and the B light, all of which are radiated from the laser light source 11. However, the R light, the G light and the B light may be individually incident on each of the light guide members 19 and 20 in a sequential manner so as to be multiplexed in the interior of each of the light guide members 19 and 20.

Furthermore, the present embodiment illustrates an example where the deflection ridges are provided on the bottom surface 21c of the light guide plate 21 so as to cause the nearly parallel light to be incident on the light guide plate 21, thereby efficiently extracting light. However, the bottom surface 21c of the light guide plate 21 may be a flat surface and a reflective diffusion member may be applied thereto by printing or the like. Furthermore, the light guide plate 21 may include minute diffusion particles in the interior thereof. Thus, it becomes possible to further reduce the possibility that light passes through the light guide plate 21 so as to be radiated from a side opposite to each of the incident surfaces, thereby causing the light quantity loss.

Figure 3:
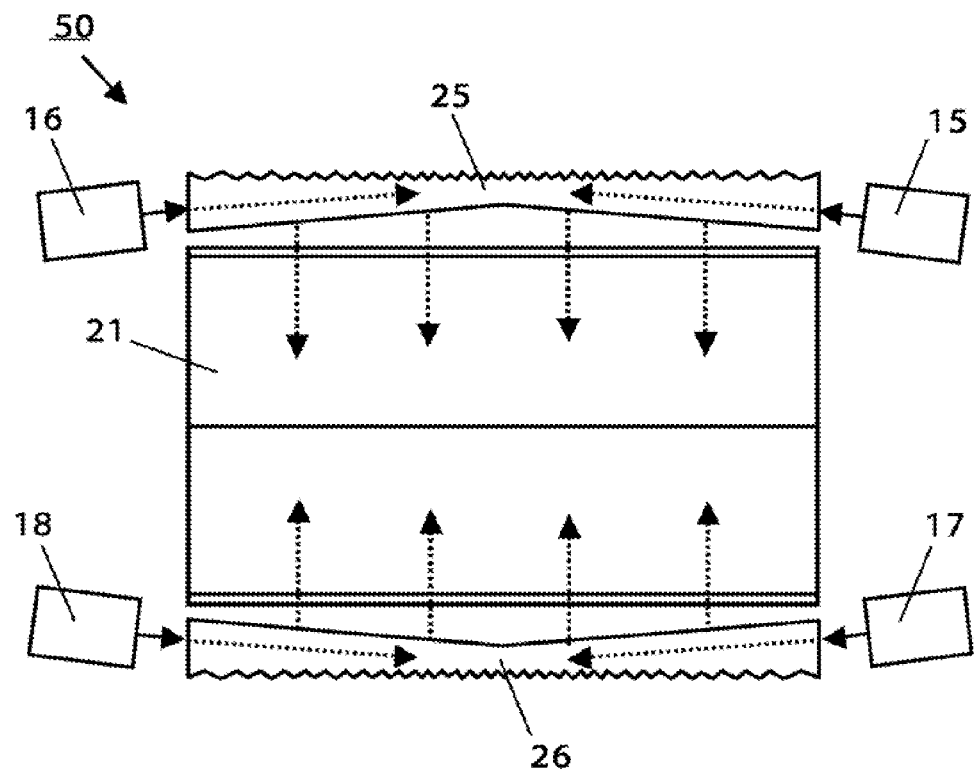
FIG. 3 is a diagram illustrating an exemplary schematic structure of a planar illumination device 50 according to the first embodiment of the present invention.

Furthermore, the present embodiment illustrates an example where the light guide member 19 or 20 has a quadrangular prism shape. However, similarly to the light guide plate 21, the light guide member 19 or 20 may have an inclined radiation surface. FIG. 3 illustrates a planar illumination device 50 in which light guide members 25 and 26, each having an inclined radiation surface, are used. FIG. 3 is a diagram illustrating an exemplary schematic structure of the planar illumination device 50 according to the first embodiment of the present invention. A structure of the planar illumination device 50 shown in FIG. 3 is the same as that of the planar illumination device 10 shown in FIG. 1 except for the lighting members 25 and 26. With such a structure, it becomes possible to reduce, in the light guide members 25 and 26 which convert light radiated from the light source sections 15, 16, 17 and 18 into linear light, the loss of light to be radiated from a side opposite each of the incident surfaces after passing through each of the light guide members 25 and 26. Thus, the light utilization efficiency is further improved.

Furthermore, the linear light source section is preferably disposed along longitudinal side surfaces of the light guide plate 21. The linear light source section is disposed along the longitudinal side surfaces of the light guide plate 21 to thereby shorten a distance over which light is propagated through the interior of the light guide plate 21 and thus making it possible to reduce light absorption loss in the light guide plate 21.

Furthermore, the present embodiment illustrates an example where the light guide member 19 or 20 having a rod shape is used to convert the light radiated from the light source sections 15, 16, 17 and 18 into the linear light. However, by using a polygon mirror or a one-dimensional diffusion component such as a cylindrical lens or a diffraction element, for example, an optical system that scans or diffuses light radiated from the light source in a one-dimensional direction may be disposed on the bottom surface of the light guide plate 21, there by causing the light to be returned by a prism or a mirror so as to be incident on the light guide plate 21 (see FIG. 4, for example).

Figure 4:
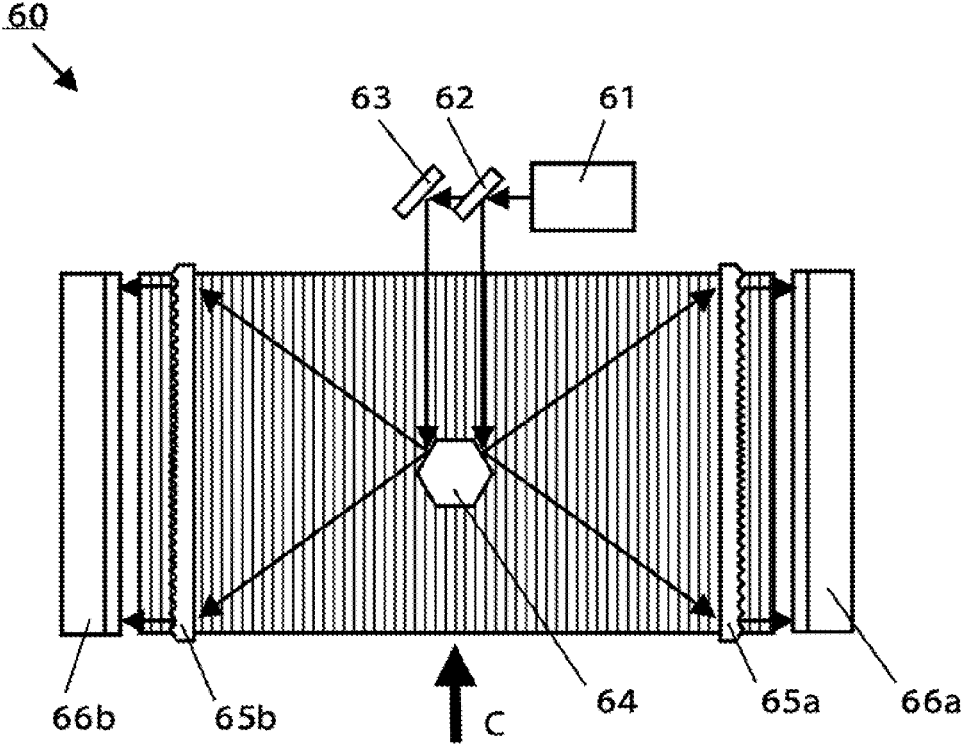
FIG. 4 is a diagram illustrating an exemplary schematic structure of a planar illumination device 60 according to the first embodiment of the present invention.
Figure 4:
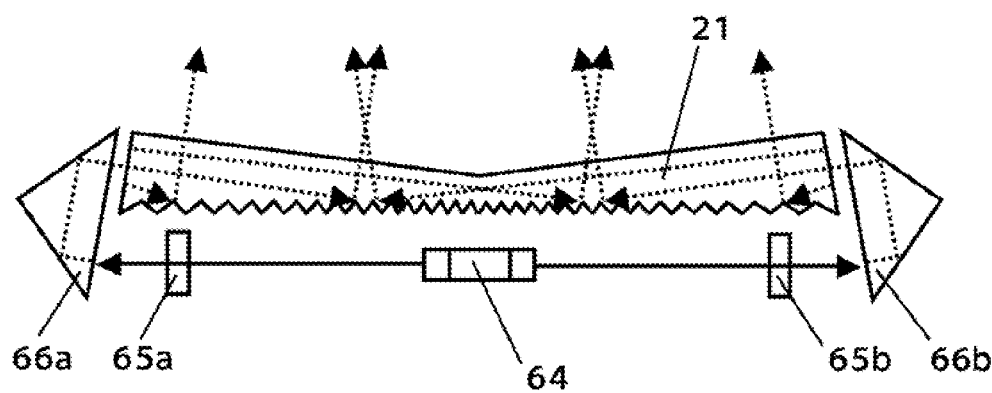

FIG. 4 is a diagram illustrating an exemplary schematic structure of a planar illumination device 60 according to the first embodiment of the present invention. In the planar illumination device 60 shown in FIG. 4, a polygon mirror for converting light radiated from a light source section 61 into linear light is disposed on the bottom surface of the light guide plate 21. FIG. 4(*a*) is a schematic view illustrating the planar illumination device 60 as viewed from the bottom surface thereof. FIG. 4(*b*) is a schematic view illustrating a structure of a main portion included in a side surface of the planar illumination device 60 as viewed from an arrow C of FIG. 4(*a*).

In FIGS. 4(*a*) and (*b*), light radiated from the light source section 61 for radiating one laser light formed by collecting the R, G, and B lights is branched off at a half mirror 62. One branched light travels directly to a polygon mirror 64, while the other branched light travels to the polygon mirror 64 via a mirror 63. As such, the lights which have reached the polygon mirror 64 are deflected and scanned on different reflection surfaces of the polygon mirror 64, and then converted into parallel lights by Fresnel cylindrical lenses 65*a* and 65*b*, thereby causing triangular prism-shaped light guide members 66*a* and 66*b* to deflect the lights by 180 degrees and further to be incident on the light guide plate 21. With the planar illumination device 60 structured in such a manner as described above, the light source section 61 can be collectively provided at one location, thereby realizing a reduced cost.

Second Embodiment

Figure 5:
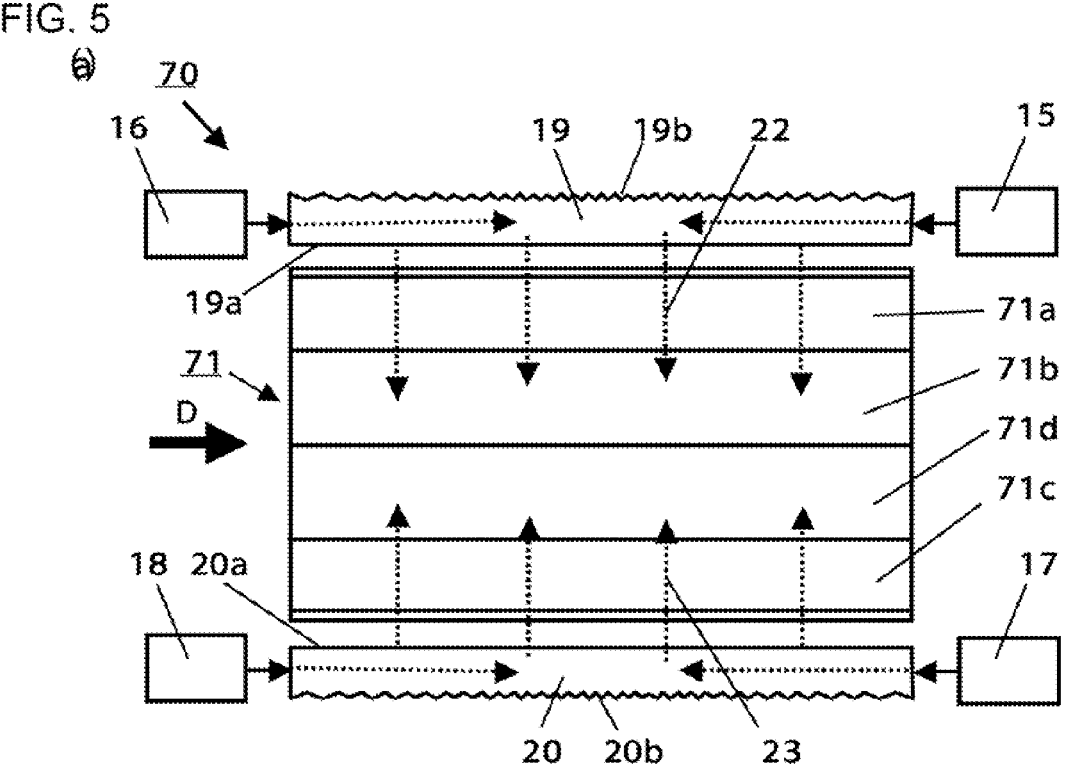
FIG. 5 is a diagram illustrating an exemplary schematic structure of a planar illumination device 70 according to a second embodiment of the present invention.

FIG. 5 is a diagram illustrating an exemplary schematic structure of a planar illumination device 70 according to a second embodiment of the present invention. FIG. 5(*a*) is a schematic view illustrating the planar illumination device 70 as viewed from a top surface thereof. FIG. 5(*b*) is a schematic view illustrating a main portion included in a side surface of the planar illumination device 70 as viewed from an arrow D of FIG. 5(*a*). In FIGS. 5(*a*) and (*b*), the same components as those of the first embodiment will be denoted by the same reference numerals, and therefore any descriptions thereof will be omitted.

As shown in FIGS. 5(*a*) and (*b*), in the light guide plate 71, light is incident from incident surfaces respectively beside the light guide members 19 and 20, so as to be radiated from main surfaces 71*a*, 71*b*, 71*c* and 71*d*. The light guide plate 71 is formed such that the main surfaces 71*a* and 71*c* are nearly parallel to each other and the main surfaces 71*b* and 71*d* form an inclined surface convex on the light radiation side. A bottom surface 71*e* is formed so as to be inclined from the respective incident surfaces toward a center thereof and to be gradually thinned toward the center. Note that if each of the main surfaces 71*a* and 71*c* is hypothetically extended toward the center, the extended surface would intersect with the bottom surface 71*e*.

Furthermore, on the bottom surface 71*e*, deflection ridges are formed such that light incident on the light guide plate 71 is polarized by the total reflection so as to be directed to the main surfaces 71*a* and 71*d*. The deflection ridges are formed so as to be nearly parallel to each of the incident surfaces.

In the planar illumination device 70 structured in such a manner as described above, laser light radiated from the light source sections 15, 16, 17 and 18, each collecting the R, G, and B lights to form one laser light, is converted into linear light by the light guide members 19 and 20 so as to be incident from both side surfaces of the light guide plate 71.

Note that each side surface of the light guide member 19 or 20 is perpendicular to a polarization plane of light radiated from the light source sections 15, 16, 17 and 18, or parallel to polarized light, and thus the polarized light is maintained while the light is reflected and propagated through the interior of the light guide member 19 or 20. Therefore, light polarized in the same direction is radiated from the light guide member 19 or 20 so as to be perpendicular to the radiation surface 19*a* and 20*a*, and further to be incident at an angle nearly parallel to the main surface 71*a* or 71*c* of the light guide plate 71.

The propagation light 22 incident on the light guide plate 71 from the light guide member 19 travels in the interior of the light guide plate 71 in a direction nearly parallel to the main surface 71*a*, and almost all luminous flux of the propagation light 22 is totally reflected by the deflection ridges provided on the bottom surface 71*e* and then polarized, and the polarized light is further to be radiated from the main surfaces 71*a* and 71*b* as the irradiation light 24.

In this case, because the main surface 71*a* of the light guide plate 71 is formed such that if the main surface 71*a* is extended, the extended main surface would intersect with the bottom surface 21*e*, the majority of the propagation light 22 being propagated nearly parallel to the main surface 71*a* will be radiated until the light reaches the center of the light guide plate 71 and therefore none of the light leaks from a side opposite to each of the incident surfaces of the light guide plate 71. Therefore, it becomes possible to prevent the light quantity loss which is a problem in the conventional structure. The same is also true of the propagation light 23.

Also, in this case, the deflection ridges provided on the bottom surface 71*c* are formed so as to be parallel to each of the incident surfaces, i.e., perpendicular to each of the propagation lights 22 and 23 in the interior of the light guide plate 71, and thus the light polarized in the same direction is radiated from the light guide plate 21.

Similarly to the first embodiment, the planar illumination device 70 structured in such a manner as described above has the advantage of being constructed to be thin, to obtain a high light utilization, and to radiate the light polarized in the same direction. Furthermore, the distance over which the light is propagated through the interior of the light guide plate 71 is shortened, thereby making it possible to reduce light absorption loss in the light guide plate 71.

The light absorbance differs depending on a wavelength, and the light absorbance of blue light, in particular, is large, whereby it is likely to cause color unevenness when a large screen display is used. However, in the present embodiment, a loss due to absorption is small and the color unevenness does not occur easily.

Figure 6:
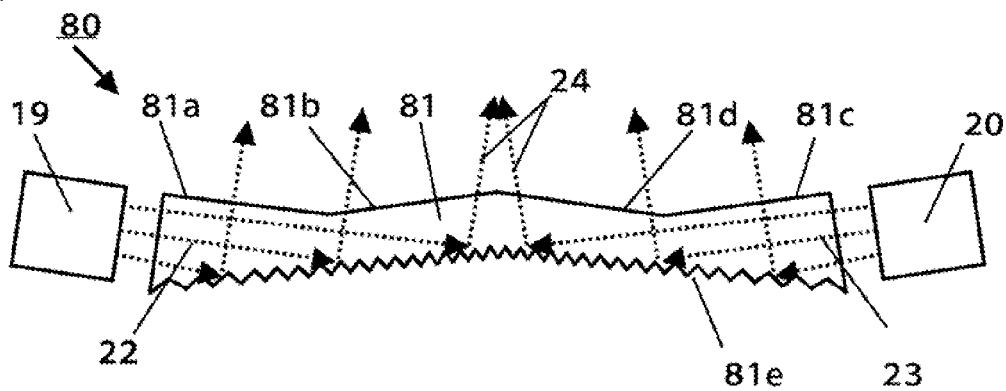
FIG. 6 is a diagram illustrating a side view of a planar illumination device 80 in which a light guide plate 81 having main surfaces 81a to 81d which are inclined to form a W-shape is used.

Note that the present embodiment illustrates an example where the main surfaces 71*a* to 71*d* of the light guide plate 71 are formed into a convex shape. However, the main surfaces 71*a* to 71*d* may be formed into a concavo-convex shape. FIG. 6 is a side view of a planar illumination device 80 in which a light guide plate 81 having main surfaces 81*a* to 81*d* which are inclined to form a W-shape is used. The planar illumination device 80 shown in FIG. 6 has the same structure as that of the second embodiment shown in FIGS. 5(*a*) and (*b*) except for the light guide plate 81, and therefore any descriptions thereof will be omitted. The planar illumination device 80 is structured such that light radiated from the light guide members 19 and 20 is incident nearly parallel to the main surfaces 81*a* and 81*c*, respectively, and therefore the effect similar to the second embodiment can be produced. The light guide plate 81 is formed in such a manner as described above, thereby making it possible to structure the planar illumination device 80 to be thinner.

Furthermore, a central portion of the light guide plate 81 shown in FIG. 6 may be a flat surface instead of a convex inclined surface, only if a thickness of the central portion is enough to ensure adequate strength.

Furthermore, the present embodiment illustrates an example where light incident from each side surface of the light guide plate 71 or 81 is to be radiated until the light is propagated to reach the center of the light guide plate 71 or 81. Therefore, the light guide plate 71 or 81 may be divided along the center, that is, the light guide plate 71 or 81 may be a V-shaped light guide plate on which light is incident from only one side surface.

Furthermore, instead of the light guide member 19 or 20, the planar illumination device 70 or 80 may use a light guide member having a side surface shape similar to that of the light guide plate 71 or 81 shown in FIG. 5 or 6. The planar illumination device is constructed as described above, thereby making it possible to reduce the light quantity loss in the light guide member.

Furthermore, it is possible to structure a liquid crystal device similar to the liquid crystal device of the first embodiment as shown in FIG. 2 by using the planar illumination device of the second embodiment as a backlight illumination device, thereby realizing a liquid crystal device with an excellent color reproduction, a high brightness and little luminance unevenness even when a large screen is used. Furthermore, a thin liquid crystal device is realized.

Third Embodiment

Figure 7:
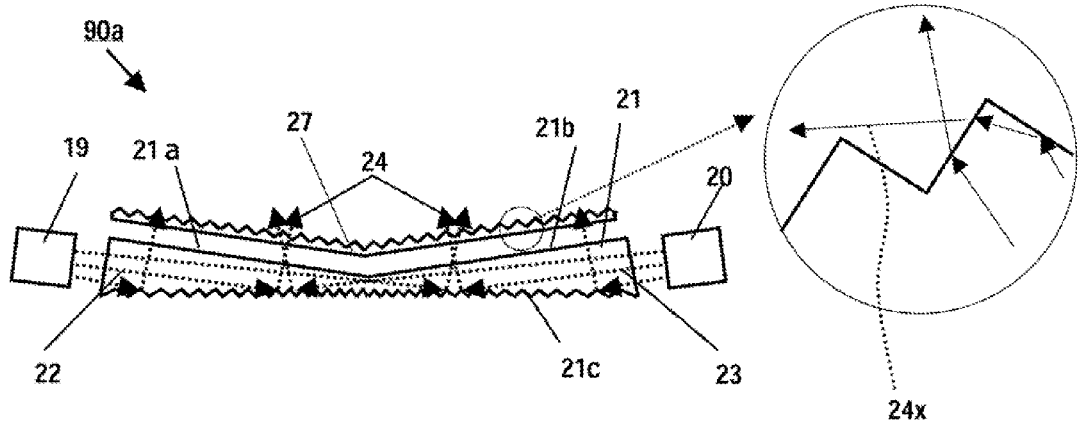
FIG. 7 is a schematic diagram illustrating an exemplary structure of a main portion included in a side surface of a planar illumination device 90a according to a third embodiment of the present invention.

FIG. 7 is a schematic diagram illustrating an exemplary structure of a main portion included in a side surface of a planar illumination device 90a according to a third embodiment of the present invention. A structure of the planar illumination device 90a shown in FIG. 7 is the same as that of the planar illumination device 10 of the first embodiment except that a prism sheet 27 formed into a V shape is further disposed along the main surfaces 21a and 21b of the light guide plate 21. The prism sheet 27 directs upward a portion of light radiated from the light guide plate 21 and recycles another portion of light radiated therefrom, thereby adjusting radiation angle distribution of light radiated from the light guide plate 21. In this case, if the prism sheet 27 were disposed to form a flat shape, a portion of light (irradiation light 24x, for example) would disappear. However, the prism sheet 27 is curved along the light guide plate 21, thereby making it possible to return the light which normally disappears to the light guide plate 21.

Figure 8:
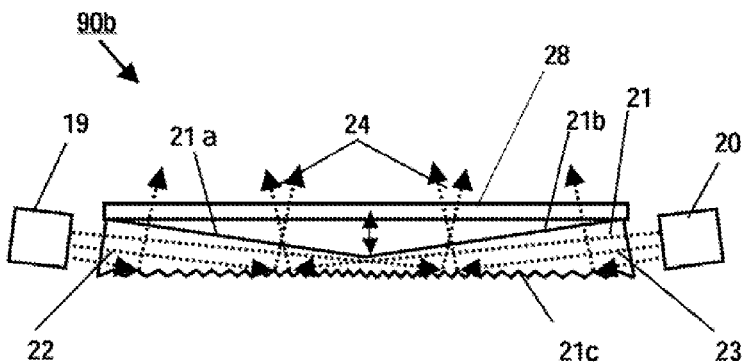
FIG. 8 is a schematic diagram illustrating an exemplary structure of a main portion included in a side surface of a planar illumination device 90b according to the third embodiment of the present invention.

FIG. 8 is a schematic diagram illustrating an exemplary structure of a main portion included in a side surface of a planar illumination device 90b according to the third embodiment of the present invention. A structure of the planar illumination device 90b shown in FIG. 8 is the same as that of the planar illumination device 10 of the first embodiment except that a flat-shaped diffusion plate 28 or a lenticular lens is further disposed along the main surfaces 21a and 21b of the light guide plate 21. In a conventional light guide plate 107 having a bottom surface formed into a chevron shape, as shown in FIGS. 12(a) and (b), in the case where a flat-shaped diffusion plate is disposed along a main surface 107a, a distance between the bottom surface of the light guide plate 107 and the diffusion plate becomes reduced in the central portion, and thus there is a problem that the irradiation light cannot be made uniform easily. In contrast, in the light guide plate 21 shown in FIG. 8, the thickness is reduced in a central portion and a bottom surface is flat. Therefore, the bottom surface of the light guide plate 21 is kept apart from the diffusion plate 28 and thus the irradiation light 24 can be uniformed even if the light guide plate 21 is thin. Furthermore, a similar effect can be obtained when a lenticular lens is disposed instead of the diffusion plate 28.

Figure 9:
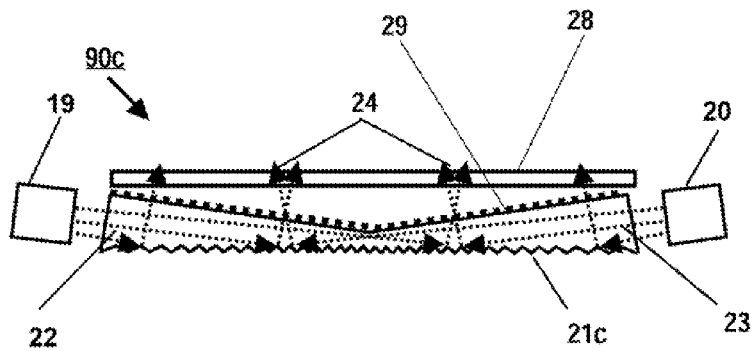
FIG. 9 is a schematic diagram illustrating an exemplary structure of a main portion included in a side surface of a planar illumination device 90c according to the third embodiment of the present invention.

FIG. 9 is a schematic diagram illustrating an exemplary structure of a main portion included in a side surface of a planar illumination device 90c according to the third embodiment of the present invention. A structure of the planar illumination device 90c shown in FIG. 9 is the same as that of the planar illumination device 90b shown in FIG. 8 except that a fine periodical structure (hereinafter, referred to as a subwavelength lattice 29) is formed on an inclined radiation surface of the light guide plate 21. The subwavelength lattice 29 is formed on the inclined radiation surface of the light guide plate 21 by means of a technique such as nanoprinting, thereby obtaining an effect of polarization separation or wavelength separation. Furthermore, the subwavelength lattice 29 is formed on the inclined radiation surface of the light guide plate 21, thereby making it possible to protect the subwavelength lattice 29 by using the V-shaped inclined surface of the light guide plate 21 and the diffusion plate 28. Furthermore, a space between the light guide plate 21 and the diffusion plate 28 is sealed, thereby making it possible to effectively protect the subwavelength lattice 29 from dust or the like.

Figure 10:
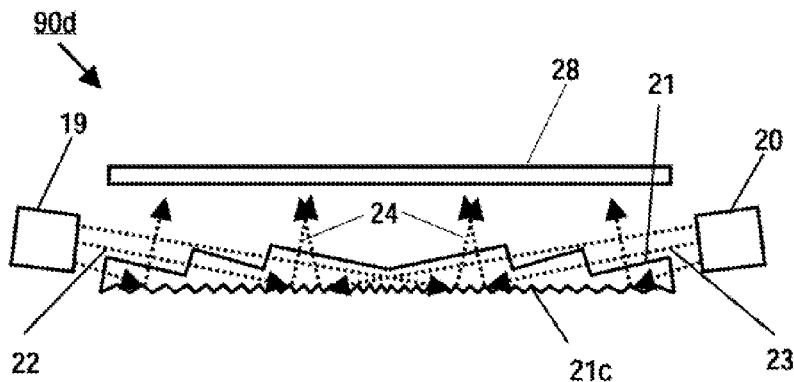
FIG. 10 is a schematic diagram illustrating an exemplary structure of a main portion included in a side surface of a planar illumination device 90d according to the third embodiment of the present invention.

FIG. 10 is a schematic diagram illustrating an exemplary structure of a main portion included in a side surface of a planar illumination device 90d according to the third embodiment of the present invention. A structure of the planar illumination device 90d shown in FIG. 10 is the same as that of the planar illumination device 10 of the first embodiment except that the light guide plate 21 has a different shape. A main surface of the light guide plate 21 is formed by a plurality of inclined surfaces, each being gradually thinned toward the center thereof and a plurality of incident surfaces, each being disposed between the incident surfaces. Furthermore, the plurality of incident surfaces of the light guide plate 21 are formed such that nearly parallel light radiated from edge surfaces on two sides of the light guide plate 21 is incident thereon. Thus, it becomes possible to reduce the weight of the light guide plate 21 and the light absorption loss in the light guide plate 21.

Figure 11:
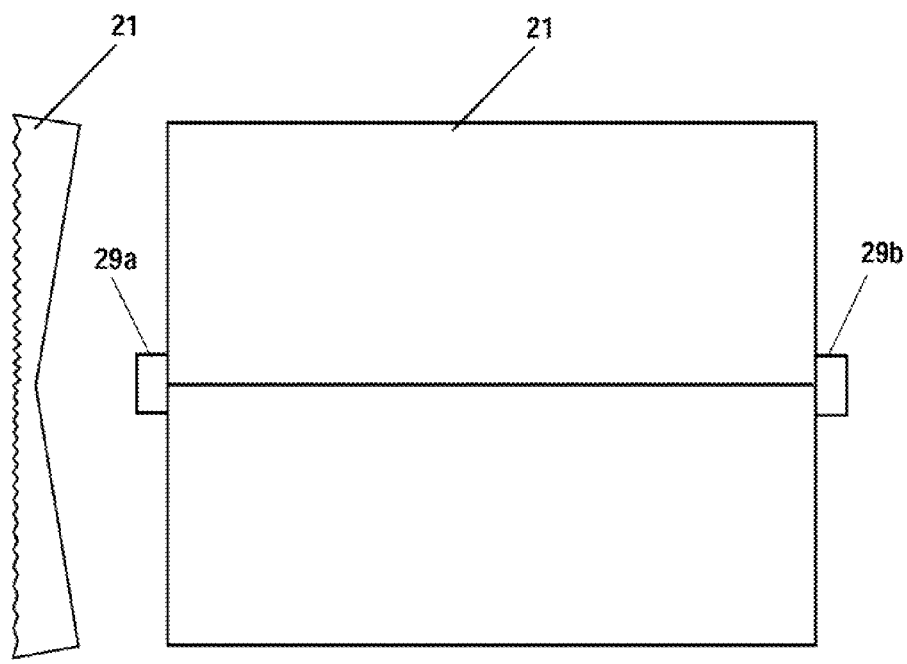
FIG. 11 is a diagram describing a manufacturing method of a light guide plate 21 according to the first embodiment of the present invention.

Next, a manufacturing method of the light guide plate according to the first to third embodiments of the present invention will be described. FIG. 11 is a diagram describing a manufacturing method of the light guide plate 21 according to the first embodiment of the present invention. With reference to FIG. 11, the light guide plate 21 according to the first embodiment is, for example, formed by injection molding, and gates 29a and 29b for injecting resin are provided at the thinnest portions of side surfaces orthogonal to the light incident surfaces, respectively. The manufacturing method of the light guide plates according to the second and the third embodiments are the same as that as described above. Thus, at a time when manufacturing the light guide plate, the resin flows easily to thereby mitigate a residual stress and reduce multi-deflection.

A planar illumination device of the present invention and a liquid crystal device using the same are applicable to a large display, a high brightness display and the like.

While the invention has been described in detail, the foregoing description is in all aspects illustrative and not restrictive. It is understood that numerous other modifications and variations can be devised without departing from the scope of the invention.

What is claimed is:
1. A planar illumination device comprising:
    a linear light source section for radiating linear laser light; and
    a light guide plate for causing the linear laser light to be incident from edge surfaces on two opposite sides thereof so as to be radiated from one main surface, wherein the main surface of the light guide plate is formed by a plurality of inclined surfaces, and the light guide plate is formed so as to be gradually thinned toward a center thereof.

2. The planar illumination device according to claim 1, wherein a thickness of a central portion of the light guide plate is thinner than that of each of the edge surfaces on two sides of the light guide plate.

3. The planar illumination device according to claim 1, wherein the light guide plate has a deflection member for deflecting light incident on a bottom surface, opposite to the main surface, of the light guide plate toward the main surface, and at least one of the plurality of inclined surfaces is formed such that if the one of the inclined surfaces is hypothetically extended, the extended inclined surface would intersect with a portion of the bottom surface.

4. The planar illumination device according to claim 1, wherein the main surface of the light guide plate is formed by the two inclined surfaces which are inclined from the edge surfaces on two sides thereof toward the center thereof, and the light guide plate is formed such that the main surface forms a concave shape.

5. The planar illumination device according to claim 1, wherein the main surface of the light guide plate is formed by the two inclined surfaces which are inclined from the respective edge surfaces on two sides thereof toward the center thereof and one flat surface joined to the two inclined surfaces, and the light guide plate is formed such that the main surface forms a concave shape.

6. The planar illumination device according to claim 1 further comprising a prism sheet for adjusting a radiation angle distribution of light to be radiated from the light guide plate, wherein the prism sheet is disposed along the inclined surfaces of the light guide plate.

7. The planar illumination device according to claim 1, wherein a diffusion plate or a lenticular lens is disposed on a side of the main surface of the light guide plate.

8. The planar illumination device according to claim 7, wherein a fine periodical structure is formed on the inclined surfaces of the light guide plate.

9. The planar illumination device according to claim 7, wherein a space between the inclined surfaces of the light guide plate and the diffusion plate or the lenticular lens is sealed.

10. The planar illumination device according to claim 1, wherein the main surface of the light guide plate is formed by the four inclined surfaces disposed in series between the edge surfaces on two sides thereof, and the light guide plate is formed such that two central inclined surfaces among the four inclined surfaces form a convex V-shape.

11. The planar illumination device according to claim 1, wherein the main surface of the light guide plate is formed by the plurality of inclined surfaces, each being gradually thinned toward the center thereof and a plurality of incident surfaces, each being disposed between the inclined surfaces, and the plurality of incident surfaces of the light guide plate are formed such that nearly parallel light radiated from the edge surfaces on two sides thereof is incident on the incident surfaces.

12. The planar illumination device according to claim 1, wherein the light guide plate includes minute diffusion particles in the interior thereof.

13. The planar illumination device according to claim 1, wherein the linear light source section is formed so as to radiate light nearly parallel to the main surface of the light guide plate toward the edge surfaces on two sides of the light guide plate, and in the light guide plate, a large number of deflection ridges are formed on a bottom surface opposite to the main surface so as to deflect, by total reflection, the light incident from the linear light source section.

14. The planar illumination device according to claim 13, wherein the linear light source section is formed such that the nearly parallel light is radiated so as to be polarized horizontally or perpendicularly to the inclined surfaces respectively adjacent to the edge surfaces on two sides of the light guide plate, and the light guide plate is formed such that the nearly parallel light is incident from the linear source section perpendicularly to the edge surfaces on two sides of the light guide plate, and the deflection ridges are formed so as to be parallel to the edge surfaces on two sides of the light guide plate.

15. The planar illumination device according to claim 13, wherein the linear light source section includes:

a laser light source for radiating divergent light;

a collimate component for converting the divergent light radiated from the laser light source into the nearly parallel light; and a rod-shaped light guide member for causing the light radiated from the collimate component to be incident from edge surfaces so as to be radiated from a side surface.

16. The planar illumination device according to claim 13, wherein the linear light source section includes:

a laser light source for radiating divergent light;

a collimate component for converting the divergent light radiated from the laser light source into the nearly parallel light; and a polygon mirror for deflecting and scanning the light radiated from the collimate component.

17. The planar illumination device according to claim 13, wherein the linear light source section includes:

a laser light source for radiating divergent light;

a collimate component for converting the divergent light radiated from the laser light source into the nearly parallel light; and a one-dimensional diffusion component for diffusing the light radiated from the collimate component in a one-dimensional direction by deflection, diffraction or dispersion.

18. The planar illumination device according to claim 13, wherein the light guide plate is formed such that each of the deflection ridges has a curved surface and a tangent of the curved surface is inclined at 30 to 60 degrees with respect to the main surface.

19. The planar illumination device according to claim 1, wherein
the light guide plate is formed by injection molding and a gate is provided at the thinnest portion of a side surface orthogonal to each of the edge surfaces on two sides thereof.

20. The planar illumination device according to claim 1, wherein
the linear light source section is disposed along longitudinal side surfaces of the light guide plate.

21. A planar illumination device comprising:
a laser light source for radiating laser light;
a rod-shaped light guide member for causing the laser light to be incident from edge surfaces on two opposites sides thereof so as to be radiated from a side surface; and
a light guide plate for causing the light radiated from the light guide member to be incident from an at least one edge surface so as to be radiated from one main surface, wherein
the light guide member is formed so as to have a rectangular cross-section parallel to each of the edge surfaces on two sides thereof,
the side surface, of the light guide member, from which the light is radiated is formed by a plurality of inclined surfaces, and
the light guide member is formed so as to be gradually thinned toward a center thereof.

22. The planar illumination device according to claim 21, wherein
the side surface, of the light guide member, from which the light is radiated is formed by the two inclined surfaces which are inclined from the respective edge surfaces on two sides thereof toward a center thereof, and
the light guide member is formed such that the side surface forms a concave shape.

23. The planar illumination device according to claim 21, wherein
the side surface, of the light guide member, from which the light is radiated is formed by the two inclined surfaces which are inclined from the edge surfaces on two sides thereof toward a center thereof and one flat surface joined to the two inclined surfaces, and
the light guide member is formed such that the side surface forms a concave shape.

24. The planar illumination device according to claim 21, wherein
the side surface, of the light guide member, from which the light is radiated is formed by the four inclined surfaces disposed in series between the edge surfaces on two sides thereof, and
the light guide member is formed such that two central inclined surfaces among the four inclined surfaces form a convex V-shape.

25. A liquid crystal device comprising:
a liquid display panel; and
a backlight illumination device for illuminating the liquid display panel from a side of a bottom surface thereof, wherein
the planar illumination device according to claim 1 is used as the backlight illumination device.

* * * * *